June 6, 1933.  J. BIJUR  1,912,359
LUBRICATION
Filed Sept. 15, 1925   6 Sheets-Sheet 1
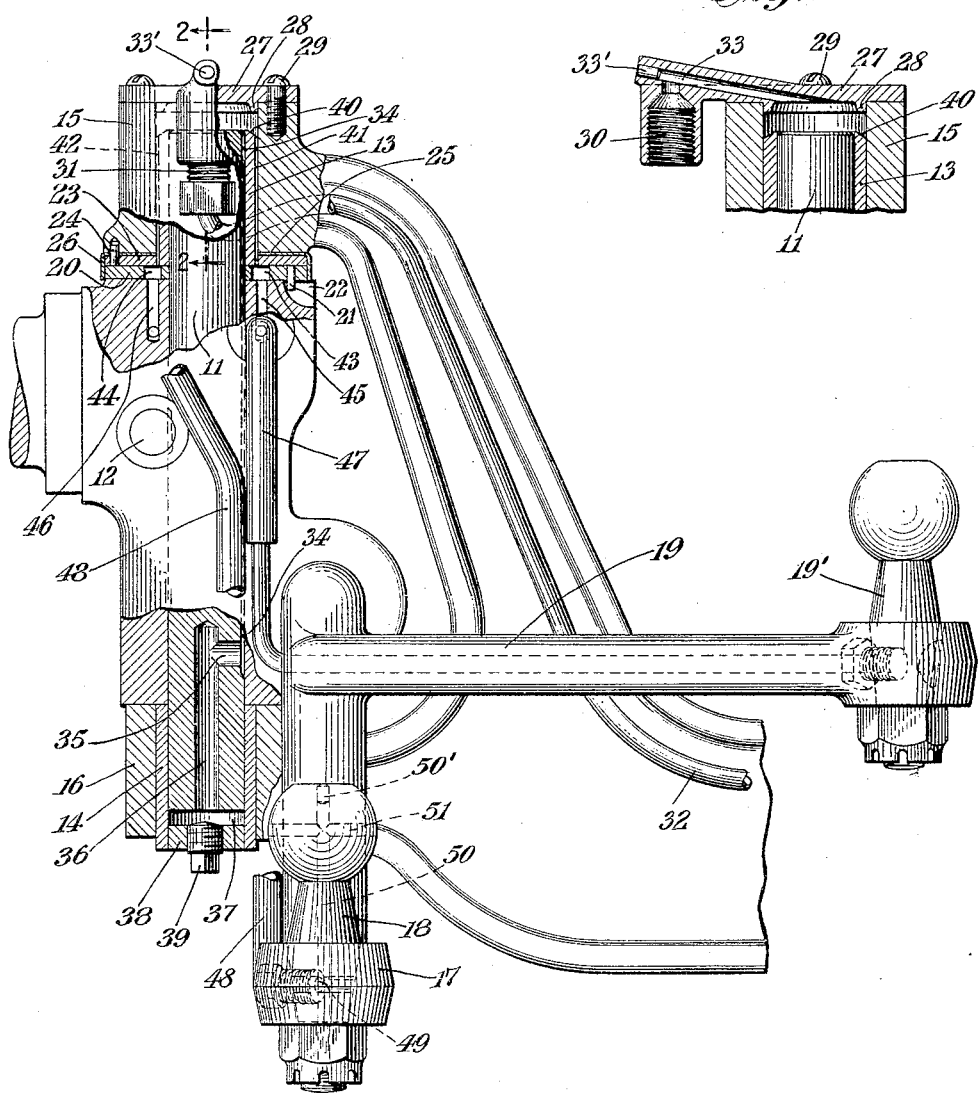
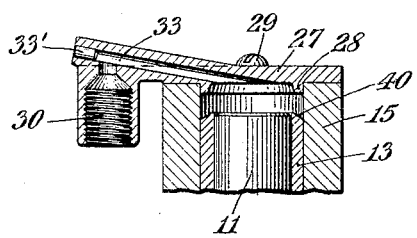
Inventor
Joseph Bijur
By his Attorneys
Dean, Fairbank, Obright & Hirsch.

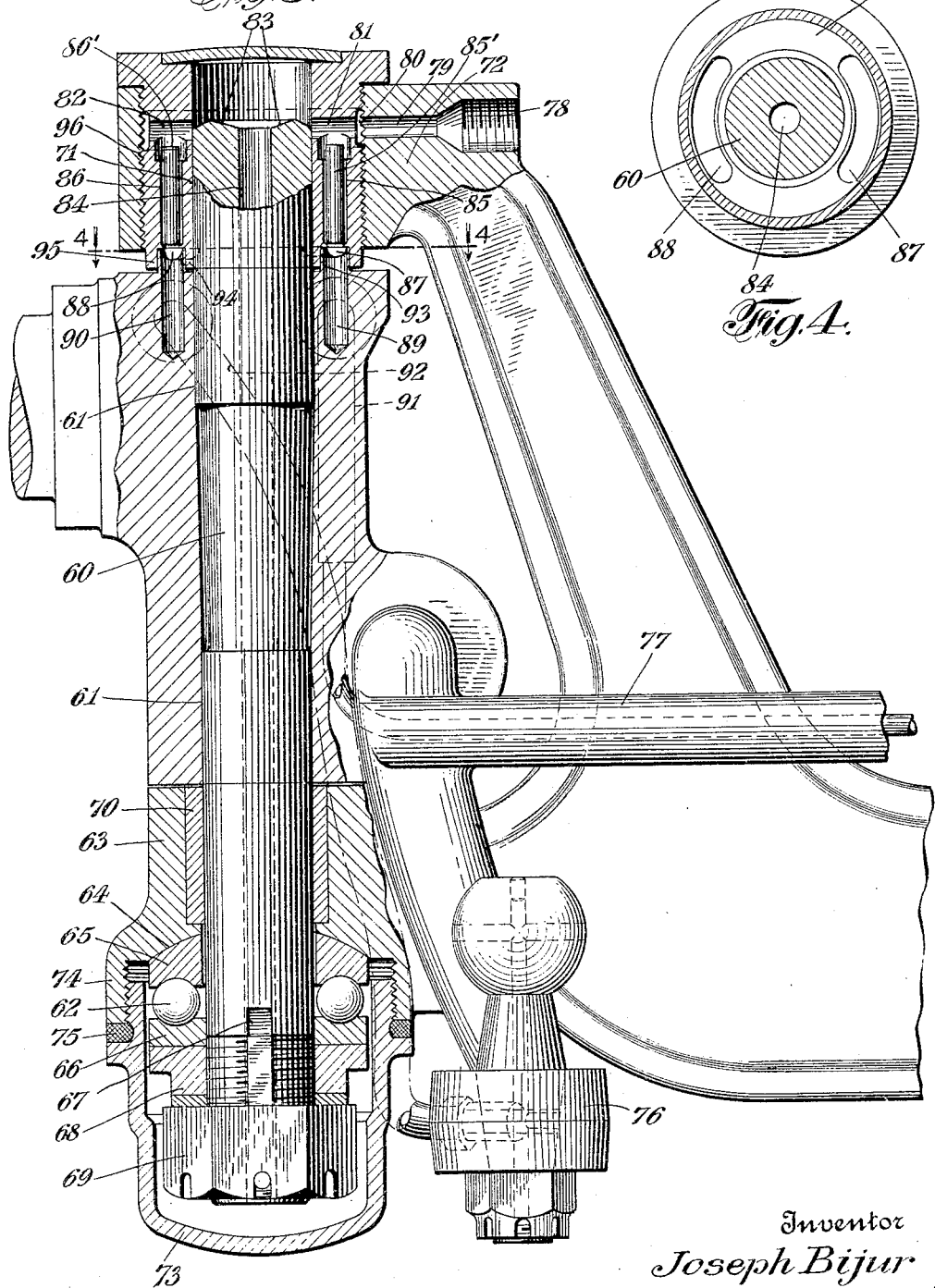

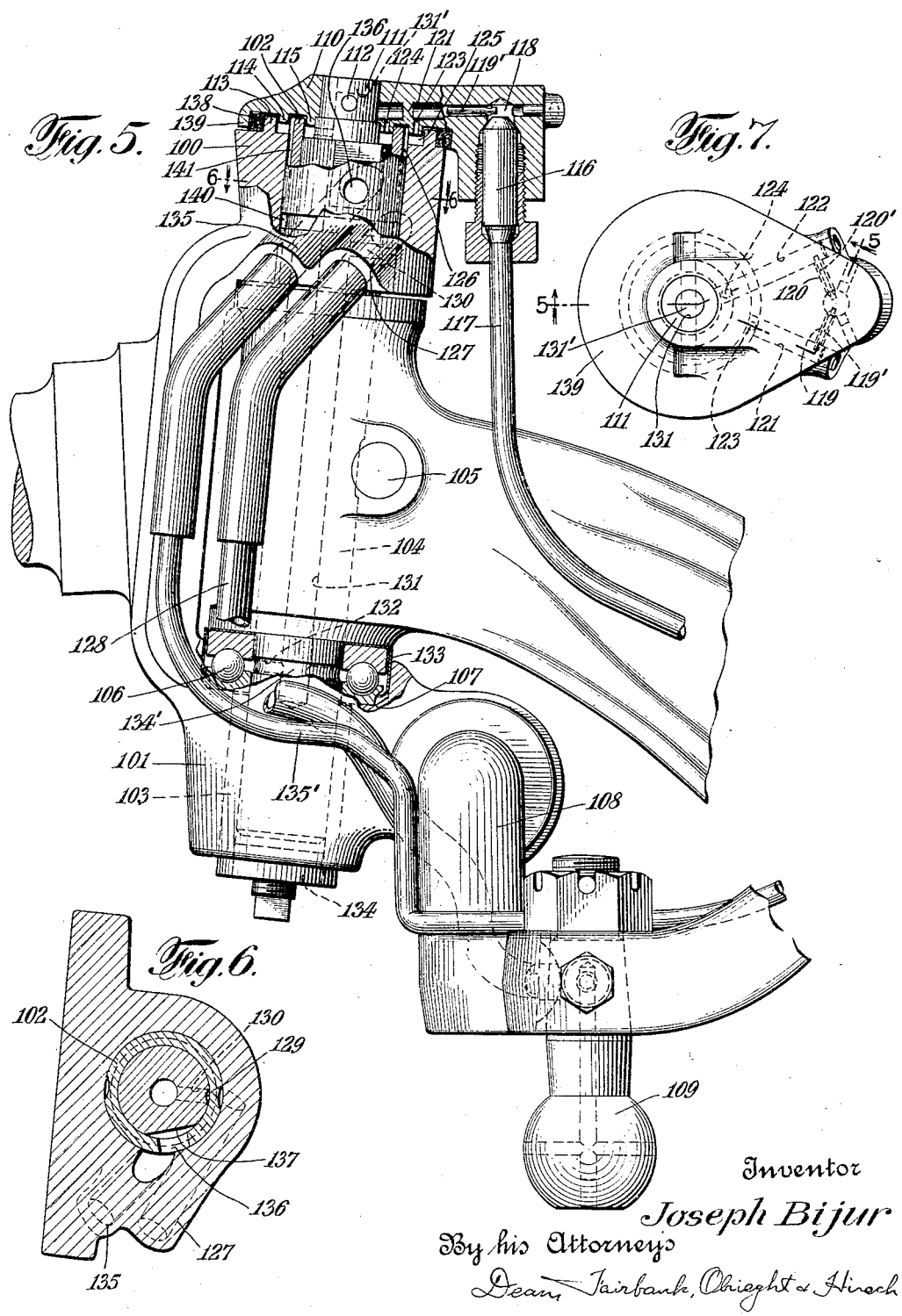

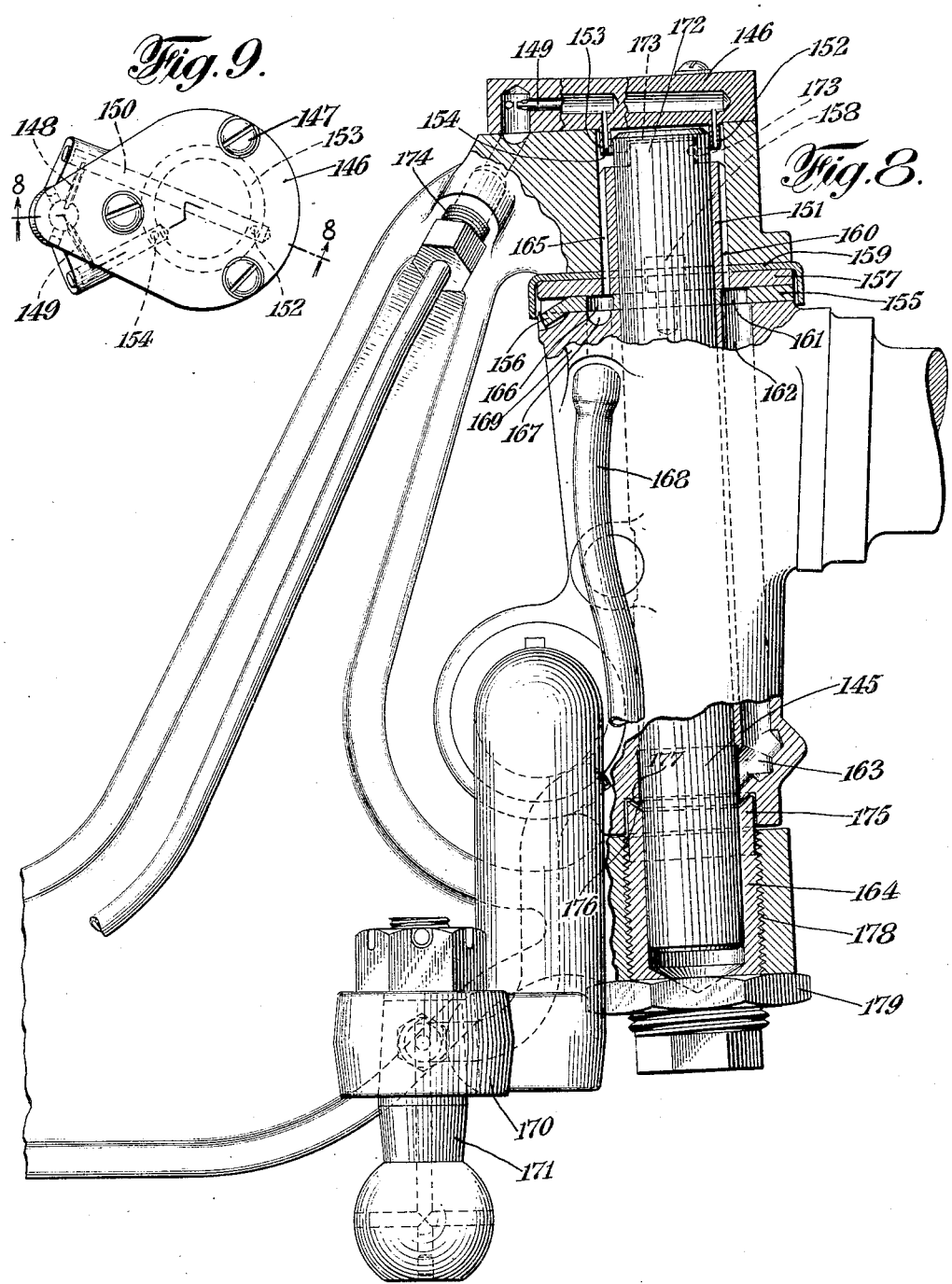

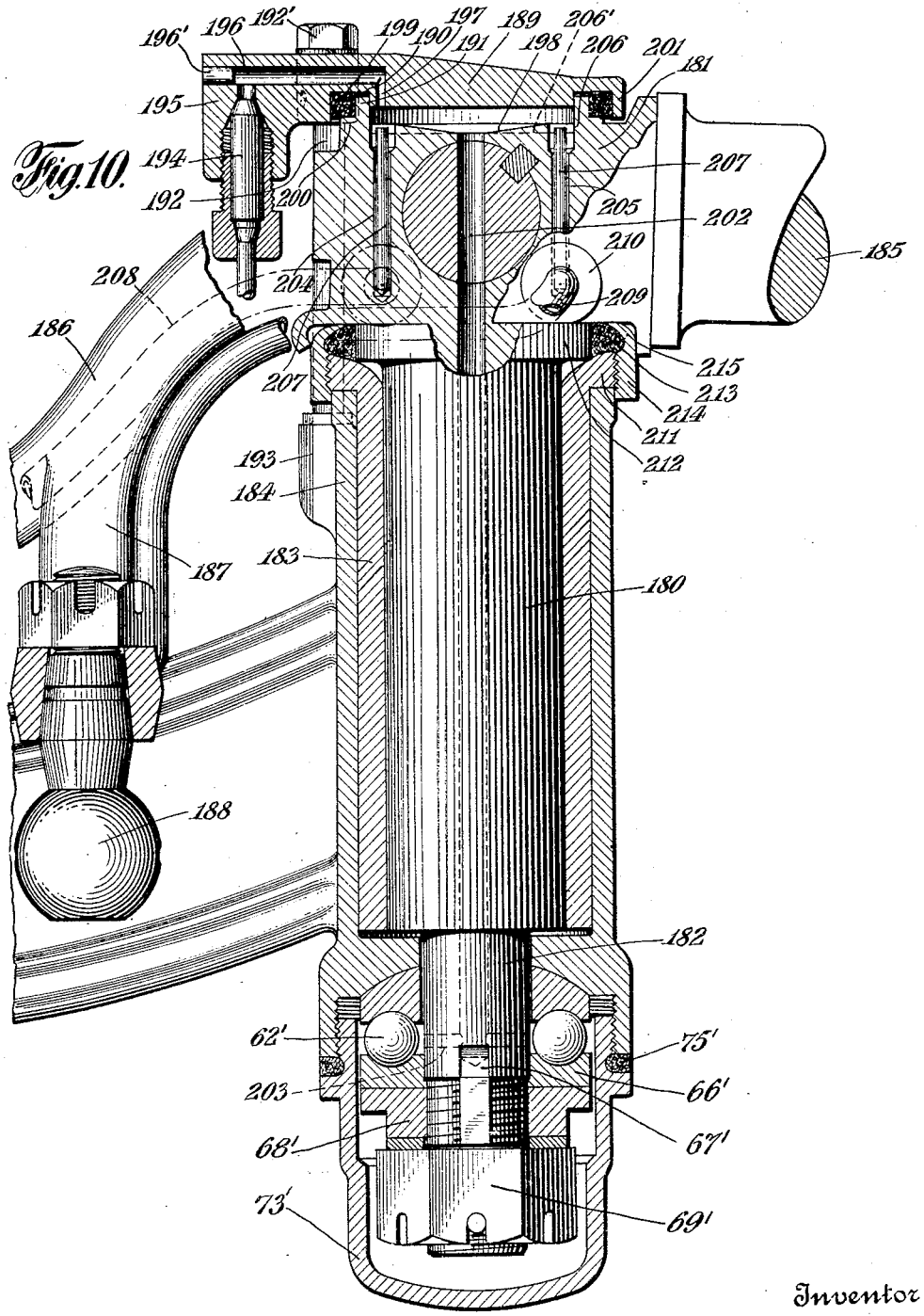

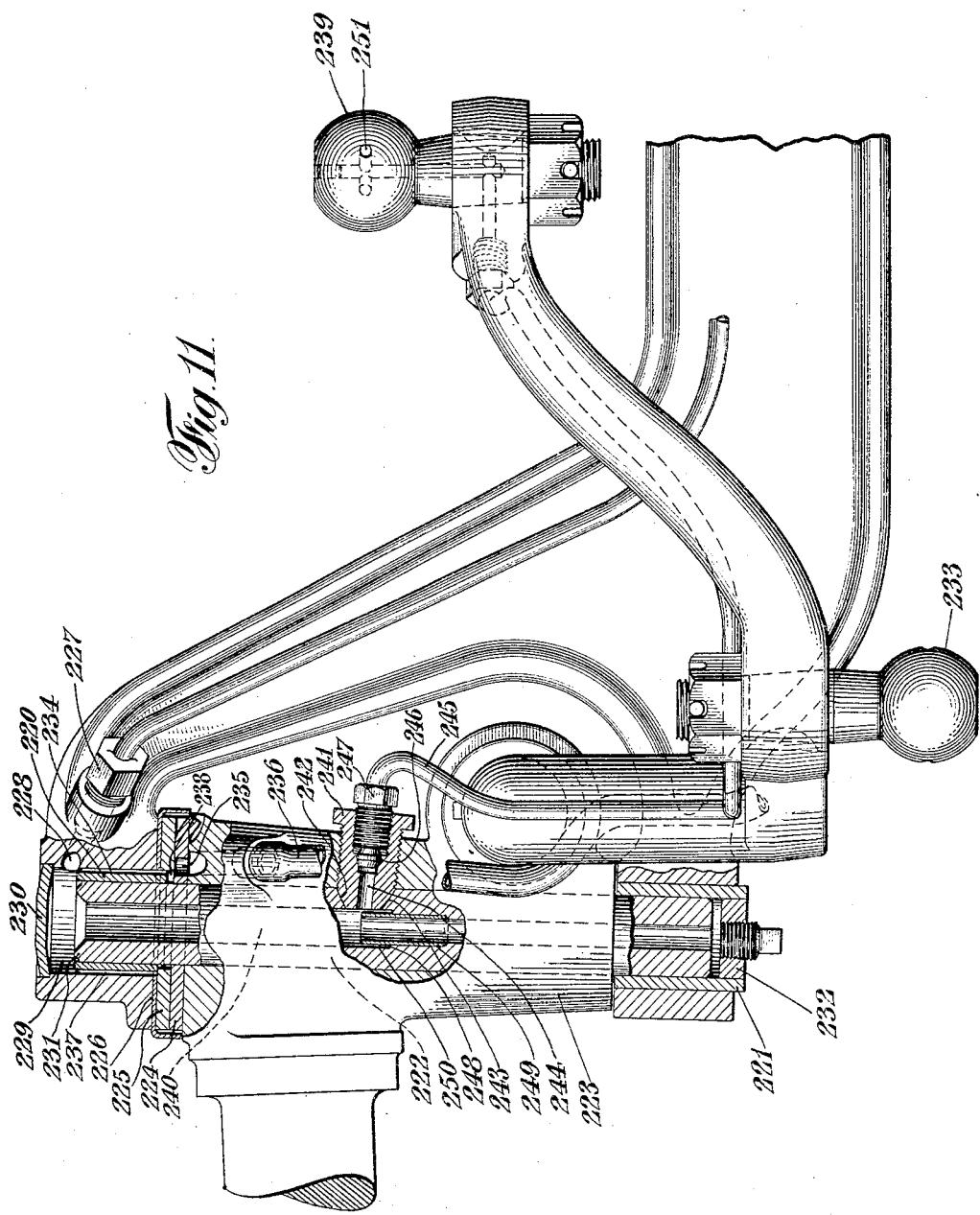

Patented June 6, 1933

1,912,359

UNITED STATES PATENT OFFICE

JOSEPH BIJUR, OF NEW YORK, N. Y., ASSIGNOR TO AUTO RESEARCH CORPORATION, A CORPORATION OF DELAWARE

LUBRICATION

Application filed September 15, 1925. Serial No. 56,435.

My present invention is concerned with gravity flow systems and has a preferred application in association with pressure lubricating systems, more particularly for delivering lubricant by gravity flow from a pressure line to the bearing or bearings of a structure having a swivel or other movable connection to the structure carrying the pressure line, and especially where it is undesirable to convey the lubricant under pressure past or across such swivel or other connection.

The invention has a preferred application to the supply of lubricant to the steering knuckles of a motor vehicle and the broad object of delivering lubricant reliably to various knuckle parts, and without the need for selective manipulation nor the use of auxiliary swivels or flapping conduits or other parts likely to become damaged in use, and which will moreover, preclude the entry of dust to the bearing surfaces.

My Patents Nos. 1,755,626, 1,755,627 and 1,755,628 are concerned with an unobstructed piping or conduit system carried by the knuckle, and especially constructed and arranged to pass lubricant therethrough by gravity flow without airblocking or syphoning, even though any vent to the system be closed by reason of the dust proofing of the swivel, across which is to flow the lubricant admitted from the pressure line terminal carried on the axle. The lubricant admitted at a part rigid with the axle and according to my prior application Serial No. 39,415 filed June 25, 1925, may be conveyed to a branched dividing inlet fitting on the knuckle which delivers to conduits that lead therefrom to knuckle bearings to be lubricated.

According to the present invention, I accomplish the various objects noted, without a branched or other dividing fitting, the use of which is avoided by admitting the lubricant from the axle to two or more inlets to the knuckle carried at the upper part thereof, and delivering to separate and distinct conduits or pipes on the knuckle that lead from said inlets to the knuckle bearings to be lubricated.

In one type of construction structure rigid with the axle and near the upper end thereof accomplishes the division of lubricant for the knuckle and leads such lubricant to the inlets of the conduits on the knuckle.

In constructions in which the thrust bearing sustaining the axle upon the knuckle is at the upper face of the knuckle, the lubricant is caused to drain through independent ports across said thrust bearing swivel to the inlets on the knuckle. In constructions in which the thrust bearing is located elsewhere, the parts are constructed for the lubricant to similarly drain across the swivel crack between the upper part on the axle and the contiguous upper part on the knuckle. Whether the lubricant is passed across the thrust bearing swivel or across a mere swivel crack, a dust proofing enclosure or encircling ring is provided so that only clean oil will enter the knuckle. The lubricant is preferably delivered from the source on the axle into a well or trough above the knuckle structure that drains through independent passages longitudinally of the bushing or bearing for the upper end of the king pin, said passages in turn draining into the ports across the thrust bearing or swivel crack.

In another type of construction, structure rigid with the knuckle accomplishes the division of the lubricant for the knuckle and leads such lubricant through distinct conduits to the knuckle bearings. Preferably the lubricant from the axle is caused to deposit upon the upper part of the pivoted knuckle structure, from which it drains through two or more independent flow control passages extending downward therefrom and leading to the knuckle conduits.

In another type of construction, lubricant from the inlet is divided at the upper end, one part flowing axially into the king pin which is rigid with the knuckle and passing to one of the control bearings thereof, through a lateral fitting which may also serve to lock the king pin into the knuckle, the rest flowing to another bearing on the knuckle by way of a passage rigid with the axle and longitudinally of the bushing into a part across the dust-proofed thrust bearing or swivel crack to a corresponding conduit on the knuckle.

In the accompanying drawings in which are shown one or more of the various possible embodiments of the several features of my invention, Fig. 1 is a side view partly in section of one embodiment, Fig. 2 is a detailed sectional view taken on line 2—2 of Fig. 1, Fig. 3 is a view similar to Fig. 1 of another embodiment, Fig. 4 is a detailed sectional view taken on line 4—4 of Fig. 3, Fig. 5 is a view similar to Fig. 1 of another embodiment, Fig. 6 is a detailed transverse sectional view taken on line 6—6 of Fig. 5, Fig. 7 is a plan view of the cap used in Fig. 5, Fig. 8 is a view similar to Fig. 1 of another embodiment, Fig. 9 is a plan view of the cap shown in Fig. 8, Fig. 10 is a view similar to Fig. 1 of another embodiment, and;

Fig. 11 is a view similar to Fig. 1 of another embodiment.

Referring now to Figs. 1 and 2 of the drawings I have shown a knuckle forging having a king pin 11 secured therein as by lock plug 12 and protruding therebeyond at its upper and lower ends to bear in the respective bushings 13 and 14 fixed in the corresponding jaws 15 and 16 of a clevis on the axle. The knuckle carries rigidly therewith, a tie rod arm having in this particular embodiment an upstanding ball stud 18 pressed by a taper-fit into the eye 17 at the outer end thereof. The knuckle is also shown with a drag link arm 19 rigid therewith, provided with a similar upstanding pivot stud 19'. The axle in this embodiment is sustained upon the knuckle by an interposed thrust bearing comprising a washer 20 resting upon the knuckle and keyed thereto by a pin 21 therein extending into a corresponding notch 22 in the knuckle and a complementary or upper disk 23 pinned at 24 into the upper clevis jaw 15. A dust-proofing cap 25 is pressed by the upper bearing disk against the upper jaw and has a skirt 26 extending into snug contact with the periphery of the bearing.

According to the present invention, lubricant is admitted from a single source to each and all of the bearings described. For this purpose, a cap 27 is provided having an appropriate pilot flange 28 fitting into the upper end of the clevis bore, said cap secured to the upper end of the axle by means of screws 29. The cap is provided with a unitary socket 30 in the lower end of a lug thereon into which there is preferably fixed a flow controlling fitting 31, which may be a drip plug of the type described in the copending application Serial No. 22,104 filed April 10, 1925 of Edward H. Kocher, said drip plug supplied with lubricant through a pipe line 32 controlled preferably from the frame of the vehicle. The lubricant from the drip plug feeds through a bore 33 radially of the cap 27 plugged at 33' at its outer end and deposits directly into the upper clevis jaw and some of the lubricant will flow along a corresponding flat 34 between the king pin and the bushing 13 to supply the upper king pin bearing. The flat terminates as shown, above the lower bushing and lubricant is drained therefrom through a radial bore 35 in the king pin into a short axial bore 36 delivering through the lower end of the king pin, into a well 37 formed between the king pin and a plug 38 pressed into the lower end of the lower bushing 14. As shown the plug 38 is provided with a screw plug 39 removable to permit access for driving out the king pin, in disassembly.

The upper end of the upper bushing is chamfered as shown at 40 so that much of the lubricant admitted through bore 33 will tend to flow into the annular groove determined by the chamfer rather than down the flat 34. The exterior of the bushing 13 is provided with three or more longitudinal grooves extending the length of the bushing, two of which are shown at 41 and 42. The lower end of the bushing as shown, extends through the upper washer and contacts the lower thrust washer 20. The bushing grooves 41 and 42 deliver respectively into apertures 43 and 44 in the lower washer 20, said apertures made arcuate so as to always be in registry with the respective bushing grooves for all positions of steering adjustment of the knuckle. The knuckle is provided with a pair of bores 45 and 46 respectively in registry with the arcuate slots, 43 and 44 which bores drain respectively to two pipes 47 and 48 both extending along the structure of the knuckle and the respective arms thereof to the drag link and tie rod bearings. The lubricant passes to the tie rod bearing through a system of bores therein, comprising a radial bore 49, delivering to an axial bore 50, plugged at 50' at its upper end, and emitting at radial bore 51. The bores of the drag link bearing are similar to those of the tie rod bearing but are not shown.

In the embodiment of Figs. 3 and 4, I have shown a different type of steering axle, in which the knuckle has a king pin 60 taper fitted thereinto as at 61 to sustain the tension due to the weight of the axle upon a thrust bearing 62 therefor, carried on the lower end of the king pin. For this purpose the lower clevis jaw 63 of the axle is provided with a spherical socket 64 in which fits the corresponding upper race 65 of the ball bearing the lower race 66 of which is held against rotation by a key 67 fixed in a corresponding groove in the king pin 60. A nut 68 is threaded upon the lower end of the king pin and is retained in locked position by a lock nut 69. The king pin performs its pivoting rocking action in a bushing 70 fixed in the lower clevis jaw immediately above the thrust bearing. The upper end of the king pin bears in a bushing 71 in the upper clevis jaw 72 of the axle.

The thrust bearing is rendered proof against loss of oil by enclosing the same in a cap 73 threaded into a corresponding socket 74 formed in the lower end of the axle clevis and rendered dust tight by an interposed gasket 75. The knuckle is shown with a tie rod bearing arm 76 and a drag link bearing arm 77 both identical with the corresponding elements in Fig. 1.

To supply lubricant to the knuckle, an inlet socket 78 at the upper axle clevis jaw is provided for carrying a drip plug (not shown), or other appropriate lubricant inlet device, which may derive its lubricant from the frame, and delivering through a bore 79 in the axle to a groove 80 peripherally about the bushing 71 which in turn delivers through radial bores 81 and 82 to the upper king pin bearing in the bushing 71 and to the upper end of the king pin. The upper end of the king pin is formed as a crater 83 to drain lubricant into and through an axial bore 84 extending the entire length thereof, and emptying into the cup 73 for the thrust bearing. Lubricant also passes from the radial bores 81 and 82 respectively through longitudinal bores 85 and 86 in the upper bushing which drain into corresponding troughs 87 and 88 in the upper face of the knuckle, said troughs arcuate to register with the bores 85 and 86 respectively for all positions of steering adjustment of the knuckle. The arcuate grooves drain into short bores 89 and 90 respectively drilled from the upper face of the knuckle which in turn drain respectively to conduits 91 and 92 identical with those in Fig. 1 and leading respectively to the tie rod and drag link bearings.

In order to avoid entry of dirt or other foreign matter at the relatively loose crack or swivel between the upper clevis jaw and the knuckle, across which the lubricant passes, the knuckle is formed with an upstanding annular flange 93 unitary therewith in which the arcuate grooves 87 and 88 are formed, said flange extending into a corresponding annular groove in the lower face of the bushing 71 which accordingly has an inner ring portion 94 encircled by the inner face of the flange 93 and an outer ring portion 95 encircling the outer face of the knuckle flange. Inasmuch as it would be impossible to insert the knuckle between the jaws of the clevis were the rings 94 and 95 initially an integral part of the axle, these rings are preferably provided as an integral part of the bushing 71 which is threaded as at 96 into the upper clevis jaw. Accordingly, in assembly, the knuckle is first placed in position between the jaws of the clevis before the bushing 71 is completely inserted and only then is it threaded home, to permit its flange to protrude beyond the axle clevis in the manner shown.

In operation, lubricant admitted through the drip plug will pass about the groove 80 some passing inward through bores 81 and 82 to the king pin crater 83 from which it drains through the bore 84 to the thrust bearing well 73. Preferably the bores 85 and 86 are restricted so that only a small part of the lubricant passes to the tie rod and drag link bearings, and the bulk would enter the king pin bore 84. If desired the restrictions may be formed by inserting pins 85' and 86' in the respective bores 85 and 86, and maintaining them in place by staking the lower ends of said bores. After the thrust bearing receptacle has thus been completely filled, all lubricant thereafter admitted through the drip plug would divide between the bores 85 and 86 and feed across the passage rendered dust proof by the encircling rings 94 and 95 into the knuckle bores 89 and 90 that deliver to the pipes 91 and 92 which supply the tie rod and drag link bearings. The thrust bearing would receive renewal oil only to supply the oil therein as it was used.

In the embodiment of Figs. 5, 6, and 7, I have shown an axle straddled by the jaws 100 and 101 of the clevis of a knuckle said jaws having bushings 102 and 103 respectively therein bearing about the ends of a king pin 104 pinned as at 105 into the axle. The axle is sustained upon the knuckle by means of a ball thrust bearing 106 resting in a corresponding socket 107 in the lower clevis jaw and sustaining the lower face of the axle eye. The knuckle is shown with a curved arm 108 keyed thereto having a downwardly extending tie rod ball stud 109 fixed therein at substantially its lowermost part and an upstanding drag link stud (not shown) fixed into its outer or uppermost end.

To supply lubricant to all of the bearings set forth I have provided an inlet cap 110 having a central aperture pressed over the reduced upper end 111 of the king pin and pinned thereonto as at 112. The knuckle is provided with an integral upstanding ring 113 over which the cap extends and the upper bushing 102 protrudes above the general face of the knuckle to substantially the upper edge of said ring 113. The cap is provided with a pilot flange 114 entering the annular space between the bushing 102 and the ring 113 and a second pilot flange 115 entering into close contact with the king pin. Lubricant is admitted to the cap by means of a construction corresponding closely to that shown in my copending application Serial No. 51,733 filed August 22, 1925. It may be briefly noted that a drip plug 116 of the type previously referred to may be mounted in a lug on the cap and supplied through line 117 controlled from the frame. A cavity 118 in the cap beyond the drip plug divides lubricant by flow through passages 119 and 120 radiating therefrom and substantially filled with flow controlling pins 119' and 120' therein leading to a pair of bores 121 and 122 extending substantially radially of the king pin and sloping downward thereto. The bore 121 drains through a port or nozzle 123 to the annular well between the exterior of the bushing and the ring 113 and bore 122 drains through a port or nozzle 124 in the inner pilot flange between the reduced king pin end and the inner face of the bushing. The outer well 125 drains through a longitudinal groove 126 preferably cut in the exterior of the bushing from the upper end, only, partway down to drain into a communicating oblique bore in the boss 127 in the upper knuckle clevis jaw formed in an integral structure therewith, which in turn, drains to a pipe 128 leading generally downward therefrom along the structure of the knuckle to the tie rod bearing 109.

The nozzle 124 which feeds to the inside of the upper bushing supplies lubricant to the bearing surface thereof as is readily understood. Some of the lubricant from the bearing surface of the bushing is drained along a longitudinal groove 129 in the king pin into a radial bore 130 which, in turn, delivers to a passage 131 formed by boring axially from the upper end of the king pin down to the level of the thrust bearing 106 and plugging the upper end thereof as at 131'. One or more radial bores 132 at the level of the thrust bearing supply lubricant thereto from the axial bore. The thrust bearing is rendered substantially dust-proof by a cap 133 enclosing the same, the rim of which is enclosed within the socket. Overflow of lubricant from said thrust bearing will tend to flow down the bearing surface in bushing 103 of the lower end of the king pin and accumulate above the plug 134 therebelow. The king pin has a circumferential groove 134' at the thrust bearing to facilitate uniform distribution of lubricant for bushing 103.

The drag link bearing derives its lubricant in this embodiment from the inner or bearing surface of the bushing 102. For this purpose, a boss 135 similar to boss 127 is provided with a bore which is in registry with a hole or notch 136 in the bushing 102 in turn adjacent a short flat area 137 on the king pin, said area of sufficient width so that part thereof will at all times be substantially in registry with the bushing aperture regardless of the position of steering adjustment of the knuckle. The flat 137 is spaced peripherally from the groove 129, so that lubricant from above the bushing will drain thereto, independently of the drainage to bore 130 and thence pass along the flat through port 136 and through boss 135 to the corresponding pipe 135' leading to the drag link bearing. Sufficient lubricant seeps between the upper bushing and the king pin to lubricate said pivot bearing.

To prevent the entry of dust or other foreign matter into the path of lubricant flow from between the lubricant inlet cap and the upper clevis jaw of the pivot knuckle an annular gasket 138 is provided encircling the upstanding flange 113 and embraced by an integral lip 139 formed as a part of the cap.

Inasmuch as the gasket 138 especially when wet with oil may exclude air, means is provided to obviate the flow impeding effect of any air in the groove 126. For this purpose the bushing is formed to permit escape of air from the path of the admitted lubricant to which end the groove 126 communicates with a peripheral groove 140 near the lower end of the bushing which, in turn, is vented through a longitudinal groove 141 at the exterior of the bushing which may be diametrically opposite the oil feeding groove.

In Figs. 8 and 9 is shown a modification of the embodiment of Figs. 5, 6 and 7 illustratively shown applied to an Elliott axle in which the axle has a clevis, the jaws of which straddle the knuckle, the king pin 145 being secured in and rocking with the latter, I have illustratively shown the knuckle not connected to the steering gear and accordingly devoid of drag link arm. The upper clevis jaw being fixed with the axle, the cap 146 corresponding to cap 110 in Fig. 5 and through which lubricant from the axle is admitted to the knuckle, is bolted to the clevis jaw as at 147, in manner similar to the construction of Fig. 1. The cap is provided with flow controlling dividing pins 148 and 149 similar to those of Fig. 5, except that bore 150 supplied from the former pin instead of leading onto the king pin, extends therebeyond to drip upon the bushing 151 through a nozzle 152 in a single pilot flange 153 between the upper end of the king pin and the bore of the upper clevis jaw, and at a part substantially diametrically opposite to the port 154 supplied from port 149. In this embodiment, I have shown instead of the ball thrust bearing of Fig. 5, below the axle, a thrust bearing comprising a washer 155 on top of the knuckle keyed thereto by a tongue 156 pressed downward therefrom, and coacting with an upper washer 157 keyed at 158 to the bushing. A dust-proofing cap 159 similar to that at 26 in Fig. 1 is provided.

The lubricant through nozzle 152 passes largely through a longitudinal groove 160 formed at the exterior of the bushing 151 which extends through the upper thrust washer 157 and rests upon the lower washer 155. The lower thrust washer 155 is provided with an arcuate aperture 161 through which the lubricant from groove 160 passes into a longitudinal bore 162 in the body of the knuckle itself, which bore communicates with an offset bore 163 to supply the lubricant therefrom to the bearing surface of bushing 164 at the lower end of the king pin 145.

The nozzle 154 similarly delivers to a longitudinal groove 165 in the upper bushing which drains into an aperture 166 in the lower thrust washer, said aperture in turn communicating with a port 167 in the corresponding upper face of the knuckle, said port delivering to a pipe 168 fitting over a nipple (not shown) in a corresponding boss 169 integral with the knuckle and leading downward to the eye 170 of the tie rod arm which supports the tie rod ball stud 171 constructed and arranged to deliver the lubricant in a manner identical with other embodiments. The upper bushing 151 is cut away at its upper end leavng a pair of diametrically opposite upstanding walls 172 which fit into corresponding recesses 173 in the pilot flange 153 of the cap. By this construction, the lubricant that has passed through the nozzle 154 is maintained substantially distinct from that delivered through nozzle 152 so that each of the longitudinal grooves 165 and 160 respectively receives its predetermined proportion of the lubricant admitted to the knuckle through drip plug 174. Some of the lubricant from nozzles 152 and 154 will seep between bushing 151 and the king pin to lubricate the bearing thereof. Some of the lubricant to apertures 161 and 167 will spread laterally between washers 155 and 157 to lubricate the thrust bearing surface.

The lower axle clevis jaw being in this case spaced by a swivel crack from the knuckle, since the upper axle clevis jaw rests on the knuckle, means is provided to render said swivel crack dust-proof in order to exclude foreign particles from the lower king pin pivot bearing. For this purpose, there is employed a construction analogous to that used for a similar purpose at the upper king pin pivot in the embodiment of Fig. 3. An upward extension lip 175 is provided on the lower bushing 164, fitting into a corresponding counterbore in the lower end of the knuckle eye and preferably beveled at its inner face as at 176 with running clearance from the correspondingly beveled inner end 177 in the counterbored knuckle. In this construction, it will be seen that any dust or dirt to enter the king pin bearing would have to pass inward between the lower clevis jaw and the knuckle and thence upward to the beveled edge 176 so that dust is effectively excluded. Inasmuch as the bushing extension 175, if fixed in the axle would prevent slipping the knuckle between the clevis jaws of the axle, the bushing is constructed and arranged to be applied after the knuckle is positioned and the king pin end is passed into the lower clevis jaw. For this purpose, the lower bushing is threaded as at 178 into the correspondingly threaded clevis jaw and adjusted as the final step in the assembly. A lock nut 179 about the threaded closed end of the bushing which is formed as a cup, prevents the bushing from being shaken loose in use of the vehicle.

In Fig. 10, I have shown another embodiment of the invention including a thrust bearing 62' identical in construction with that shown in Fig. 3, corresponding parts designated by the same reference numerals primed. In this embodiment instead of the king pin shown in Fig. 3, I have provided a king pin stud 180 formed as an integral part of the knuckle upon the reduced end 182 of which pivot stud the thrust bearing is sustained. The stud bears in a bushing 183 press fitted into a corresponding socket 184 of substantial length formed as an integral part of the axle immediately above the thrust bearing chamber 73'. The wheel spindle 185 extends above the knuckle as does the knuckle body 181 from which there extend the tie rod arm 186 and a drag link arm 187 provided with ball studs, the latter of which shown at 188 extends downward and the former of which is not shown.

To lubricate the various bearings described, I have in this embodiment provided an inlet cap 189 having an annular groove 190 enclosing the upstanding flange 191 provided on the knuckle, said cap supported by a long stud 192 therethrough threaded at its lower end into an integral lug 193 on the axle socket 184 and secured by nut 192' on the upper end of said stud. Lubricant may be admitted through a drip plug 194 lodged in a lug 195 in the lower face of the cap 189, and feeding through a bore 196 in said cap plugged as at 196' at its outer end and draining through a nozzle 197 preferably near the rim of a countersink or well 198 formed in the upper face of the knuckle. To render the construction substantially proof against entry of dust or other foreign particles, an annular gasket 199 is housed in the cover member and pressed thereby against a corresponding shoulder 200 on the knuckle, the cap having a wall 201 snugly encircling the outer periphery of the gasket and extending therebelow, as shown. The countersink 198 drains at its center through a bore 202 of substantial diameter, extending substantially the entire height of the pivot stud and terminating at substantially the level of the ball thrust bearing 62' which is supplied from said bore through radial bores 203 in the pivot stud.

Lubricant is also delivered from near the periphery of the countersink 198 to the tie rod and drag link bearings through smaller vertical bores 204 and 205 enlarged as at 206 at their upper ends and connected by a peripheral groove 206' to more readily intercept some of the lubricant, and carrying pins 207 therein, as shown, of but slightly less diameter than the bores 204 and 205 to afford restricted passageways. Pipes 208 and 209 respectively are affixed by appropriate terminals 210 to the lower ends of the restricted passages 204 and 205, said pipes extending respectively along the structure of the arms 186 and 187 to supply the respective bearings. It will be seen that the lubricant will tend more readily, in the construction disclosed, to flow through the axial king pin bore than through the restricted passages 205 and 206 until the thrust bearing receptacle is completely filled, as well as the king pin bore which occurs after a short interval of use, since the thrust bearing well is leak proof.

To avoid overflow of lubricant that has risen from the thrust bearing throughout the height of the bushing 183 and to preclude the entry of dirt or dust, at the upper open crack or swivel between the axle socket 184 and the knuckle, I provide the dustproofing construction shown, according to which the bushing 183 is provided with an integral flange 211 resting upon the upper edge of the socket 183 upon which is superposed a flange 212 formed on the pivot stud, said flange encircled by a gasket 213 enclosed by a screw cap 214 threaded upon the bushing flange and exerting compression at its inturned upper flange 215 upon the gasket.

In Fig. 11 is shown another embodiment of knuckle straddled by the jaws of an axle clevis with bushings 220 and 221 therein, which form bearings for the protruding ends of a king pin 222 fixed in the knuckle 223. A thrust bearing generally similar to that in Fig. 8 is provided, including a disk 224 resting on the knuckle, a disk 225 fixed by a key fitting a notch in the lower end of the bushing 220 and a dust-proofing swivel cap 226 clamped between the upper disk 225 and the upper clevis jaw. The lubricant in this embodiment is shown admitted through a drip plug 227 applied at the upper clevis jaw and draining through a bore 228 therein to a space 229 within the upper clevis jaw and above the king pin, which space is closed by a friction-fitted cap 230. The king pin is provided with a unitary ridge 231 about the upper end of the bore, extending to substantially the level of the upper edge of the bushing 220, to effect substantial uniformity of division of lubricant between the king pin bore and the bushing grooves. The lower bushing 221 is closed by a plug 232 in the same manner as in Fig. 1, to prevent loss of lubricant therefrom. In the present embodiment, the tie rod bearing 233 is supplied in manner substantially identical with the construction of Fig. 8. It need merely be briefly noted that a longitudinal groove 234 at the exterior of the bushing 220, drains into a port 235 in the lower thrust washer which, in turn, drains to a pipe 236 along the knuckle leading to the ball stud 233 of the tie rod arm. Air blocking is prevented by the construction of bushing shown, as in the construction of Fig. 5, in which several longitudinal grooves 237 at the exterior of the bushing are connected to groove 234 by an annular space 238 below the bushing.

The drag link bearing 239 in this case, is supplied also with lubricant from the inlet fitting 227 by flow through a longitudinal bore 240 in the king pin, which bore also supplies in this embodiment the lower bushing 221. The lubricant is fed from between the ends of the longitudinal bore in the king pin to supply the drag link bearing, through a plug 241 threaded into the knuckle structure and having a tapered inner end 242 contacting with a liquid-tight fit a corresponding aperture 243 through the wall of the king pin, opening into the longitudinal bore 240. The plug has a longitudinal bore 244 therein, establishing communication to a pipe 245 leading to the drag link bearing, said pipe connected to the plug by a compression sleeve 246 thereabout and a bushing 247 threaded into the plug.

To assure correct division of lubricant from the longitudinal bore 240 between the drag link and the lower king pin bearing, I have provided a shoulder 248 in the king pin bore between the lower part of smaller diameter and the upper part of larger diameter. In a corresponding counterbore in the lower part is press-fitted a short length of tubing 249 of diameter smaller than the upper part of the bore, affording an annular space 250 thereabout. In the embodiment shown, the outlet 251 from the drag link bearing is at level slightly below the horizontal bore through the king pin locking plug and the rim of tube 249 is at a level between the lowest and the highest part of the inlet to bore 244, all for a purpose appearing in the description below, of the operation. The bores through the ball studs 233 and 239 are not here described, as they are identical with the corresponding construction in the embodiment of Figs. 1 to 3.

In operation, lubricant admitted through the drip plug 227 will collect in the well 229 above the king pin and some will seep through the longitudinal groove 234 in the bushing to flow to the tie rod bearing in the manner above described. Inasmuch as the bore is restricted, a considerable proportion of the lubricant will flow past the lowest part of the annular ridge 231 of the king pin, from which some lubricates bushing 220, while the rest flows into the large bore 240 in the king pin, trickling down the side wall thereof and rapidly filling the small annular space 250 between the tube 249 and the bore 240. Lubricant will overflow from the rim of the tube 249, part flowing inward down the tube 249 into the space below the king pin, welling up from plug 232 to lubricate the lower king pin bearing, while the rest overflows outward through the bore 244 in plug 241 into the pipe 245 to the drag link bearing. Excess lubricant welling up in bushing 221 will overflow past the upper rim thereof and wash out any dirt that might otherwise accumulate thereat, although a special dustproofing instrumentality such as is shown in Fig. 8 is preferred.

Inasmuch as the tube 245 below the drag link bearing determines a trap, this will at all times remain substantially filled with lubricant, after once it has been charged therewith. Air blocking at the substantially horizontal inlet through the locking plug 247 is substantially precluded since the lubricant overflowing from the tube 249 must enter along the lower side of said tube and air will readily escape along the upper side thereof, even though the entire length of pipe 245 be of diameter too small to permit passage of lubricant about any air therein, in a vertical part of such pipe.

In all of the embodiments disclosed, I prefer to use a drip plug inlet of the type shown in the copending application of Edward H. Kocher, Serial No. 22,104 filed April 10, 1925, in which pressure through a line is absorbed so that the lubricant will pass without substantial pressure or largely by gravity flow from the stationary axle part into the pivoted knuckle and across the intervening swivel bearing or swivel crack from the axle into the knuckle structure. This feature is shown and more broadly claime in my copending application, Serial No. 39,415 filed June 25, 1925.

In addition, I prefer in each of the constructions to arrange the pipe in manner shown, in the drawings, but not separately described, so as to obviate blocking by air of the flow of lubricant to a bearing and also to preclude the syphoning through a lower bearing of lubricant from a higher bearing, in the case of a pipe line such as disclosed having a continuously open connection from a higher through a lower bearing. To effect these results, I have embodied the principles shown in by copending application last mentioned, and as these principles are not herein broadly claimed per se, it need merely be stated briefly that the pipes leading to the lower or in this case, the tie rod bearings and drooping continuously downwardly from their inner to their outer ends are made of bores sufficiently large to permit flow of lubricant about any air therein. This is also true of the bores in the king pin or knuckle delivering lubricant to the lower thrust or tie rod bearings. In the case of a drag link bearing having an upstanding ball stud, the connecting conduit is made of large diameter as set forth down to a level at least as low as that of the lubricant outlet, as shown for instance at 47, the conduit therebeyond in which lubricant would normally become trapped, being, if desired, of smaller diameter, or I employ the special construction of Fig. 11, fully described above.

In certain of the claims, I use the term "control bearing" as applying to one of the bearings of the knuckle. This term defines generically any of the bearings at the knuckle by which an operating adjustment on the knuckle or the wheel thereon is effected or transmitted from one to the other knuckle.

It will also be understood that while the specific drip plug construction above referred to, is preferred as the terminal from which the knuckle bearings are supplied, terminals of other construction may be employed, regardless whether they may be properly designated as drip plugs, provided only they emit the lubricant no faster than it can be accommodated in the knuckle and the bearings thereof.

In the accompanying claims the bearings which are referred to as control bearings or as being associated with, subsidiary to or carried by the knuckle include the upper and lower pivotal or king pin bearings or a single pivotal bearing, such as shoyn in Fig. 10, the thrust bearing whether of the ball bearing or washer type, which also may be referred to as a pivotal bearing, and the drag link and tie rod bearings which are carried at the end of the arms projecting from the knuckle structure. One of the knuckles is provided with both drag link and tie rod bearings while the other knuckle is provided solely with a tie rod bearing. The lubricating installations of the present application may also be utilized to supply lubricant to other control bearings, which may be associated with, carried by, or subsidiary to the knuckle, and these bearings, particularly in the case of the brake bearings, may be positioned closely adjacent to instead of being positioned directly on the knuckle structure.

The pivot mount or king pin may be solid or tubular and is generally fixed to the axle or knuckle and pivotally connected to the other element. With clevis arrangements, such as shown in Figs. 1, 3, 5, 9 and 11, whether the clevis be on the axle or on the knuckle usually the upper and lower ends of the king pin protrude within the jaws of the clevis and have bearings therewithin which are supplied with lubricant by the installations of the present invention.

In the case of Fig. 10, however, the king pin or pivot mount is supplied with an axle below the knuckle, instead of two bearings on either side of the knuckles, as in the other figures. The thrust bearings, which may either be of the ball bearing or washer type, may be positioned between the bearings of the king pin and at a place where the king pin passes from within the axle structure to within the knuckle structure or they may be positioned at either end of the king pin, as for example shown in Fig. 10.

By the expressions king pin and axle, as utilized in the accompanying claims, is included respectively the pivotal mount for the knuckle and the supporting member extending from the chassis of the automobile with which said pivot mount or king pin connects to afford a pivotal connection for the knuckle.

The various conduits carried by or enclosed in the knuckle structure include the passageways 36, 41, 42, 45, 46, 47, 48 of Fig. 1; 84, 85, 86, 89, 90, 91 and 92 of Fig. 3; 126, 128, 129, 131, 135, 136 and 137 of Fig. 5; 160, 162, 165 and 168 of Fig. 9; 202, 204, 205, 208 and 209 of Fig. 10; and 234, 236, 237, 240, and 245 of Fig. 11. It will be noted that included in or associated with these passages are the dividing or proportioning passages, which are restricted and which may be formed by pin restrictions as in the caps of Figs. 5 and 8 and in the bushings of Figs. 3 and 10, or by grooves in the king pin bushings, particularly upper king pin bushings, as shown in Figs. 1, 5, 8 and 11.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:—

1. In a motor vehicle, in combination, an axle, a knuckle having control bearings and having a swivel coaction with said axle, an inlet admitting lubricant for the knuckle at a part rigid with the axle, conduit means delivering lubricant therefrom across swiveling parts to parts rigid with the knuckle, and a pair of independent conduits carried by the knuckle, each having a distinct inlet near said swivel and leading to the corresponding control bearing for delivery of the lubricant from the inlet fitting by gravity flow.

2. In a motor vehicle, in combination, an axle, a knuckle having surfaces rigid therewith performing a swiveling movement in steering, relatively to contiguous elements of the axle, one or more bearings associated with said knuckle, an inlet delivering lubricant into a part rigid with the axle and emitting lubricant substantially free from pressure, conduit means supplied from said inlet and leading to the knuckle side of the axle structure, said knuckle having a pair of independent passageways carried thereby, extending generally downward to said associated bearings to supply the latter by gravity flow with lubricant from said inlet.

3. In a motor vehicle, in combination, an axle, a knuckle having associated bearings, and having a swivel coaction with said axle, an inlet admitting lubricant for the knuckle at a part rigid with the axle, a passageway delivering lubricant therefrom to a part rigid with the knuckle across a bearing therebetween, means encircling the contiguous relatively swiveling parts of the axle and knuckle, across which the lubricant is passed and rendering said swivel substantially dust-tight, and a pair of independent conduits carried by the knuckle, each having a distinct inlet near the upper part of said knuckle, and leading to the associated bearings, for delivery of the lubricant from the inlet fitting by gravity flow.

4. In a motor vehicle, in combination, an axle, a knuckle having a pivotal mount thereat, control bearings carried by said knuckle, a pair of distinct pipes extending downward from near the upper end of said knuckle, a lubricant inlet rigid with the axle, and means rigid with the axle effecting a division of the admitted lubricant and delivering said lubricant to said distinct pipes.

5. In a motor vehicle, in combination, a knuckle, an axle, one of said members having a clevis straddling the other, bearings associated with said knuckle, an inlet fitting carried by the axle near the upper part thereof and emitting lubricant therefor, substantially devoid of pressure, a pair of generally vertical passageways supplied from said inlet fitting and draining downward into the upper face of parts rigid with the knuckle structure, and a pair of conduits carried by said knuckle and having independent inlets for intercepting the lubricant admitted to said knuckle parts in order to deliver the same onward to said associated bearings.

6. In a motor vehicle, in combination, a knuckle, a pivot structure therefor and rigid therewith, an axle including an upper clevis jaw encircling the upper end of the pivot structure, and forming a bearing therefor, other bearings associated with said knuckle, an inlet fitting at said clevis jaw, a pair of passageways longitudinally of said clevis jaw supplied from said inlet fitting and draining downward into the upper face of the knuckle structure, means encircling the contiguous faces of said clevis and said knuckle to substantially prevent the entry of dust therebetween, and a pair of conduits carried by said knuckle and having independent inlets for intercepting the lubricant admitted to said knuckle face in order to deliver the same onward to said other bearings.

7. In a motor vehicle in combination, a knuckle, an axle, one of said members having a clevis straddling the other, a lubricant inlet carried by a part on said axle, dividing passages rigid with said axle and near the upper end thereof and supplied from said inlet, control bearings carried by the knuckle, and separate conduits carried by the knuckle and leading to said bearings, each having a distinct inlet near the upper end of the knuckle intercepting the lubricant from the corresponding dividing passage.

8. In a motor vehicle in combination, a knuckle, an axle, one of said members having a clevis straddling the other, a lubricant inlet carried by a part on said axle, dividing passages rigid with said axle and near the upper end thereof and supplied from said inlet, bearings associated with the knuckle, and separate conduits carried by the knuckle and leading to said bearings, each having a distinct inlet near the upper end of the knuckle intercepting the lubricant from the corresponding dividing passage, and an annular dust-excluding member at the swivel between the upper end of the knuckle and the upper part of the axle across which the lubricant is fed from the axle to the knuckle.

9. In a motor vehicle, in combination, a knuckle having control bearings associated therewith, an axle having a part rigid therewith extending above said knuckle, means admitting lubricant from a part rigid with said axle for gravity flow to the upper end of parts rigid with the knuckle, vertical passageways draining from said inlet, and separate and distinct conduits carried by said knuckle and connected with said passageways and leading to said control bearings.

10. In a motor vehicle, in combination, an axle, having a jawed clevis, a knuckle having associated bearings and straddled by the jaws thereof and having a king pin rigid therewith bearing in said clevis jaws, means effecting a substantially dust-tight closure at the swivel between the upper face of the knuckle and the adjacent part of the upper clevis jaw a lubricant inlet to said clevis jaw, and a pair of generally vertical passageways within said dust-tight closure draining from the clevis jaw into the knuckle for leading lubricant to corresponding bearings.

11. In a motor vehicle, in combination, an axle, a knuckle having control bearings, bearings affording a pivot mount between the knuckle and the axle, lubricant conduits carried by the knuckle, each having a distinct inlet at one of said pivot mount bearings, said conduits leading to the respective control bearings, and flow dividing means rigid with the axle supplied from a single fitting on the axle and admitting separate charges of lubricant from the axle to the knuckle side of said pivot mount bearing for entry to the distinct conduit inlets.

12. In a motor vehicle, in combination, an axle, a knuckle, a pivot pin bearing mount for the latter, an inlet cap rigid with said axle and closing the upper end of said pivot mount, bearings carried by said knuckle, conduits on said knuckle leading from near the top thereof to said bearings and draining passages supplied from said inlet cap and extending vertically through said axle exteriorly of the pivot pin to drain lubricant to said conduits.

13. In a motor vehicle, in combination, an axle, having a clevis, a knuckle having bearings straddled thereby, a thrust bearing sustaining the former upon the latter, means rendering said thrust bearing substantially dust tight, an axle lubricant inlet and a pair of passageways through said thrust bearing draining from said axle inlet into said knuckle for leading lubricant to corresponding bearings.

14. In a motor vehicle, in combination, a knuckle, a pivot structure therefor and rigid therewith, an axle including an upper clevis jaw encircling the upper end of the pivot structure and forming a bearing therefor, other bearings associated with said knuckle, an inlet fitting at said clevis jaw, a pair of passageways longitudinally of said clevis jaw supplied from said inlet fitting, a thrust bearing sustaining said upper clevis jaw upon the upper end of the knuckle structure, means extending about said thrust bearing to substantially prevent the entry of dust thereinto, said passageways draining downward across the thrust bearing into the upper face of the knuckle structure and a pair of conduits carried by said knuckle and having independent inlets for intercepting the lubricant from said passageways in order to deliver the same to said other bearings.

15. In a motor vehicle, in combination, an axle, a knuckle having bearings associated therewith, one of said members having a clevis straddling the other, a thrust bearing sustaining the axle upon the knuckle, means encircling said thrust bearing to render the same substantially dust proof, a lubricant inlet carried by said axle, means on said axle dividing the lubricant supplied from said inlet, ports through said thrust bearing draining said lubricant into the knuckle, and conduits carried by said knuckle delivering to said associated bearings the lubricant drained thereto.

16. In a motor vehicle, in combination, an axle having a clevis, a knuckle having bearings straddled by the jaws of said clevis, and having a king pin fixed therein bearing in said clevis jaws, a thrust bearing sustaining said axle upon said knuckle, a lubricant inlet carried by said axle near the upper end thereof and conduit means lengthwise of said king pin leading to said thrust bearing, said thrust bearing having apertures leading into corresponding bores in the upper face of the knuckle and passageways draining said bores and leading along the knuckle structure to bearings thereof.

17. In a motor vehicle, in combination, an axle having a clevis, bushings press-fitted into the jaws of said clevis, a knuckle straddled by said clevis jaws and having a king pin fixed therein bearing in said bushings, bearings associated with said knuckle, a thrust bearing interposed between the upper face of said knuckle and the upper clevis jaw, means admitting lubricant from said axle to the space above said king pin and passageways longitudinally of said upper bushing independently of said king pin feeding downward to said thrust bearing, draining through apertures in the latter into downward bores in the upper face of knuckle and a pair of conduits carried by said knuckle and leading lubricant from said bores to said associated bearings.

18. In a motor vehicle, in combination, an axle having a jawed clevis, a knuckle having control bearings and straddled by the jaws of said clevis and having a king pin fixed therein and bearing in said clevis jaws, a lubricant inlet at the upper clevis jaw, a pair of longitudinal bores within said clevis jaw exteriorly of the king pin, draining into corresponding longitudinal bores in the knuckle, said knuckle having conduits draining said bores and leading to said control bearings, and an axial bore in the king pin supplied with lubricant from said inlet and leading to a bearing surface associated with the lower end of said king pin.

19. In a motor vehicle, in combination, an axle having a jawed clevis, a knuckle straddled by the jaws thereof, a king pin fixed therein and bearing in said jaws, means admitting lubricant to the upper clevis jaw, said king pin having a flat extending downward therealong to a level above that of the lower bearing thereof and a radial bore draining the lower end of said flat and communicating with an axial bore in the portion of the king pin therebelow, the lower bearing of said king pin being sealed to prevent loss of lubricant therefrom.

20. In a motor vehicle, in combination, an axle, a knuckle having a pivot mount thereat, control bearings carried by said knuckle, an inlet fitting near the upper part of said axle, conduit means rigid with said axle, a passageway on said knuckle draining lubricant from said means to one of said control bearings, another passageway rigid with the knuckle and leading to the other control bearing, the uppermost parts of both said passageways at substantially a common level and in open communication with said inlet fitting.

21. In a motor vehicle, in combination, an axle, a knuckle having a king pin pivot mount therefor and one or more control arms rigid therewith, with bearings thereon, means for lubricating the king pin and control arm bearings, said means including a flow controlling inlet fitting rigid with the axle, a lubricant dividing well substantially coaxial with the king pin and supplied from said inlet fitting, passageways along the parts of said knuckle, for delivering lubricant from said well to said control bearings by gravity flow, the bearing of said king pin having dammed communication with the inlet fitting for lubrication of said king pin bearings.

22. In a motor vehicle of the type including an axle, a king pin therethrough and rigid therewith, a knuckle having a clevis straddling said axle end and having a bearing mount at the ends of said king pin; the combination therewith of lubricant collecting means coaxial with and in open communication with the bearing surface at the top of said king pin, a bore through said king pin draining lubricant from said collecting means and delivering to the lower king pin bearing, a pipe structure in flow intercepting relationship with respect to said collecting means carried by said knuckle and extending along the knuckle structure to a bearing thereof at level lower than said king pin bore, said conduit structure having a substantially larger inlet with respect to said collecting means than that of said king pin, whereby most of the lubricant from said collecting means will pass by gravity flow to the knuckle and the king pin will receive but little of the lubricant.

23. In a motor vehicle, in combination, an axle, a knuckle having one or more control arms rigid therewith, with bearings thereon, means for lubricating the king pin and control arm bearings, said means including a flow controlling inlet fitting rigid with the axle, a lubricant dividing well substantially coaxial with the king pin and supplied from said inlet fitting for delivery of lubricant to said control bearings by gravity flow through corresponding passageways along the parts of said knuckle, said king pin having enclosed dust-proof bearing surfaces devoid of exit, thereby preventing the loss of lubricant therefrom and an open restricted passage supplied from said inlet fitting to intercept but small quantities of lubricant from the latter for supplying the king pin bearing surface.

24. In a motor vehicle, in combination, an axle, a knuckle, a king pin pivot mount for said knuckle, an inlet fitting rigid with the axle, a collecting chamber supplied therefrom and disposed at the upper end of the king pin, a dammed connection from said collecting chamber to supply lubricant to the bearing surface of the king pin and a lubricant pipe carried by said knuckle and having its upper end in flow intercepting relationship with respect to said collecting chamber, said pipe having branches for supplying a pair of bearings on said knuckle by gravity flow.

25. In a lubricating installation, in combination, an axle, a knuckle having a clevis straddling the end of said axle, a king pin fixed in said axle and affording bearings for said knuckle clevis, a tie rod bearing stud, a steering arm having a bearing stud extending above the length of said arm, a lubricant distributer coaxial with said king pin and above the upper end thereof, a constricted passage leading from said distributer through the upper bearing of the king pin, said king pin having a bore supplied from said constricted passage and delivering to the lower bearing thereof, a pipe installation carried by said knuckle and leading along the knuckle structure to the tie rod and steering bearing studs thereof, the cross-sectional area of the pipe installation above the level of lubricant trapped in the steering arm conduit being sufficient to permit the passage of lubricant around the air therein.

26. In a lubricating installation, in combination, an axle, a knuckle having a clevis straddling the end of said axle, a king pin fixed in said axle and affording bearings for said knuckle clevis, a lubricant distributer coaxial with said king pin and above the upper end thereof, a constricted passage leading from said distributer to the upper bearing of the king pin, said king pin having a bore supplied from said constricted passage and delivering to the lower bearing of said king pin, a pipe installation carried by said knuckle and leading along the knuckle structure to the tie rod and drag link bearings, the cross-sectional area of the pipe installation above the level of lubricant trapped along the steering arm being sufficient to permit the simultaneous entry of lubricant and escape of air, and the downwardly extending pipe to the tie rod bearing being of cross-sectional area sufficiently large to prevent the formation of a continuous column of lubricant therein.

27. In a knuckle for a motor vehicle, in combination, an axle, a knuckle, a king pin affording a steering mount for said knuckle, said king pin having a bearing bushing near its upper end, an annular lubricant well above said bushing, having restricted communication with the bearing surface thereof, and a downwardly inclined pipe having its inlet in communication with a groove at the exterior surface of said bushing, said groove being supplied from said well.

28. In a motor vehicle, in combination, an axle, a knuckle pivotally mounted in respect thereto having bearings associated with the knuckle, one of said elements having a clevis straddling the other, a dust proofing enclosure including a thrust bearing swivel sustaining the axle upon the knuckle, another dust proofing enclosure at the swivel crack between the face of said knuckle opposite said thrust bearing and a corresponding part on the axle, a lubricant inlet carried by said axle and near the upper end thereof, means carried by said axle adjacent said inlet dividing the lubricant therefrom, and separate and distinct conduits carried by the knuckle and leading to bearings associated therewith, one of said conduits extending longitudinally of the pivotal axis of the knuckle and delivering into the second mentioned enclosure at said swivel crack.

29. In a motor vehicle, in combination, an axle, a knuckle, one of said members having a clevis straddling the other, pivot bearings for the knuckle, and a thrust bearing sustaining the axle upon the knuckle associated with one of said pivot bearings, means for rendering dust-tight the knuckle pivot bearing not associated with the thrust bearing, said means comprising a bearing bushing having an annular extension protruding with small clearance to telescope with respect to a contiguous part of the straddled member and affording only an upwardly extending course of substantial length for the entry of foreign particles to the bearing and an arrangement to lubricate said bearings including a conduit system extending longitudinally of said pivot bearings and inside of said axle and knuckle and passing from within the knuckle to within the axle inside of said annular extension to lubricate said bearing bushing.

30. In a motor vehicle, in combination, an axle, a knuckle, one of said members having a clevis straddling the other, pivot bearings for the knuckle, and a thrust bearing sustaining the axle upon the knuckle associated with one of said pivot bearings, means for rendering dust-tight the knuckle pivot bearing not associated with the thrust bearing, including a bearing bushing for the knuckle threaded into the corresponding clevis jaw and in home position having an annular extension beyond the limiting plane of the straddled member affording small clearance with respect thereto to provide an upward path of substantial length for precluding entry of foreign particles thereto and an arrangement to lubricate said bearings including a conduit system extending longitudinally of said pivot bearings and inside of said axle and knuckle and passing from within the knuckle to within the axle inside of said annular extension to lubricate said bearing bushing.

31. In a motor vehicle, in combination, an axle, a knuckle associated therewith having bearings to be lubricated, a king pin affording a pivot mount for the latter on the former, one of said members having a clevis straddling the other, the upper jaw of said clevis having a bushing therein, encircling the corresponding end of the king pin, a cap member rigid with the axle and closing the upper end of the bushing, said cap affording a divided lubricant inlet having a pair of nozzles from both of which lubricant drips upon said bushing, said bushing having a pair of passageways substantially aligned with said nozzles, and a pair of independent conduits carried by said knuckle and leading to said knuckle bearings and supplied from said passageways.

32. In a motor vehicle, in combination, an axle, a knuckle associated therewith having bearings to be lubricated, a king pin affording a pivot mount for the latter on the former, one of said members having a clevis straddling the other, the upper jaw of said clevis having a bushing therein, encircling the corresponding end of the king pin, a cap member rigid with the axle and closing the upper end of the bushing, said cap affording a divided lubricant inlet having a pair of nozzles from both of which lubricant drips upon said bushing, said bushing having a pair of independent conduits carried by said knuckle and leading to said knuckle bearings and supplied from said passageways, a part of said bushing constituting a barrier between the associated passageways to prevent commingling of lubricant admitted through the nozzles.

33. In a motor vehicle, in combination, an axle having a clevis, a knuckle carrying bearings to be lubricated and having a king pin pivotal mount on said axle, a bushing in the upper clevis jaw encircling the upper end of said king pin, one of said knuckle bearings being a thrust bearing sustaining the upper clevis jaw upon the knuckle, an inlet cap secured to the upper clevis jaw and having a pair of independent dividing passages therethrough, drip apertures through said cap aligned with corresponding grooves longitudinally of said bushing to feed to the thrust bearing and independent passageways carried by the knuckle draining the lubricant from said thrust bearing to other knuckle bearings.

34. In a motor vehicle, in combination, an axle having a clevis, a knuckle extending between the jaws of the clevis and having a king pin therein, a bushing press-fitted in the upper clevis jaw and affording a bearing for the king pin end, a thrust bearing comprising a lower washer on the knuckle and an upper washer substantially against the upper axle clevis jaw, a cap secured to the clevis jaw and having a pilot flange extending thereinto above the bushing, a lubricant inlet fitting feeding into said cap from the axle, dividing passageways in said cap feeding through corresponding nozzles in the pilot flange, said bushing having longitudinal grooves aligned with the respective nozzles extending through the upper thrust bearing and draining past the upper thrust washer to conduits carried by the knuckle.

35. In a motor vehicle, in combination, an axle, a knuckle, a king pin with upper and lower bearing surfaces affording a pivot mount for said knuckle and a thrust bearing above the knuckle sustaining the axle thereon, means admitting lubricant to the knuckle near the upper end of the axle, said means draining lubricant across the thrust bearing into said knuckle, said knuckle having a longitudinal bore in the structure thereof extending downward to deliver into the lower king pin bearing thereof, said bore of sufficient diameter to prevent passage of lubricant about any air therein.

36. In a motor vehicle, in combination, an axle and a knuckle, one having a clevis having upper and lower jaws and the other being straddled by the jaws thereof, a king pin pivot mount between these elements, a thrust bearing to sustain the axle upon the knuckle, and a dust-tight bearing for the lower end of the king pin, said bearing comprising a bushing cup threaded into the lower clevis jaw about the king pin end and having an annular extension at the upper end thereof protruding into a corresponding countersink in the straddled member affording small clearance, and a lubricating installation feeding said thrust bearing and said bushing cup having an inlet above both said thrust bearing and bushing cup and a conduit system inside of said axle and knuckle leading thereto.

37. In a motor vehicle, in combination, an axle and a knuckle, one having a clevis having upper and lower jaws and the other being straddled by the jaws of said clevis, a king pin pivot mount for the knuckle, a thrust bearing interposed between the knuckle and the upper clevis jaw, a bearing bushing cup for the lower end of the king pin threaded into the lower clevis jaw and having an annular extension protruding into a corresponding countersink in the straddled element, means for supplying lubricant to said bushing from an accessible point, said means comprising a lubricant inlet, a passageway carried by the knuckle and extending downwardly from an upper part thereof and terminating above the bushing extension, the end of the bushing extension and the corresponding counterbore being beveled downward and inward to cause the lubricant to enter the bushing rather than to escape through the gap between the bushing extension and the straddled member.

38. In a motor vehicle, in combination, an axle, a knuckle carrying bearings and having parts swiveling with respect to contiguous parts on the axle, an inlet affixed to said axle and delivering lubricant from the axle to the knuckle side of one pair of said contiguous parts, a pair of conduits enclosed in part by said knuckle, and a pair of restriction passageways in advance of said conduits controlling the division of lubricant thereto from said inlet, said conduits leading to said bearings.

39. In a motor vehicle, in combination, an axle, a knuckle having a pivot bearing thereat, including a bushing rigid with one of said members and a stud bearing therein and rigid with the other of said members, said knuckle having a pair of bearings carried thereby and extending below said bushing, a lubricant inlet and separate conduits fed from said inlet enclosed by said knuckle, one communicating with the exterior of said bushing, and the other with the interior of said bushing, said conduits draining to the respective knuckle bearings.

40. In a motor vehicle, in combination, an axle, a knuckle having a pivot bearing thereat including a bushing rigid with one of said members and a stud bearing therein and rigid with the other of said members, said knuckle having a pair of bearings carried thereby and extending below said bushing, a lubricant inlet and separate conduits fed from said inlet enclosed in part by said knuckle, and spaced passageways of restricted flow area to control the lubricant flow one for each conduit extending longitudinally downwardly of the pivot bearing along the sides of the bushing supplying lubricant from said inlet to said conduits, said conduits feeding said bearings.

41. In a motor vehicle, in combination, an axle, a knuckle, a mounting bearing therebetween a common source of lubricant on the axle, conduits enclosed in part by said knuckle for supplying bearings associated with the knuckle, one of said conduits draining lubricant from the bearing surface of said mounting bearing and a duct in the knuckle receiving lubricant from the source and supplying it to another conduit, said duct and said mounting bearing surface both supplied from the common source of lubricant on the axle.

42. In a motor vehicle, in combination, an axle, a knuckle having a clevis the jaws of which straddle said axle, a king pin fixed in said axle, the upper clevis jaw having a bushing bearing about the upper end of said king pin, bearings carried by said knuckle, conduits carried by said knuckle and extending along the structure thereof downward from said upper jaw to said bearings, one of said conduits communicating with a groove at the exterior of said bushing, the other of said conduits communicating through a port in said bushing with the interior face thereof, said structure including a lubricant chamber adjacent said bushing from which both the exterior groove and the interior of the bushing derive their lubricant, and an inlet carried by the axle and delivering to said chamber.

43. In a motor vehicle, in combination, an axle, a knuckle having associated bearings, one of said members having a clevis having upper and lower jaws straddling the other, a pivot mount for the knuckle on the axle having bushings in the clevis member, a cap rigid with the axle encircling the upper clevis jaw, a lubricant inlet carried by said cap, flow control means in the path of lubricant flow from said inlet draining respectively to the exterior and the interior of the upper bushing, a longitudinal passageway along the exterior of the bushing, a conduit draining said passageway and leading to one of the associated bearings of the knuckle, and a second conduit leading to another associated knuckle bearing and draining lubricant from the interior of the upper bushing.

44. In a motor vehicle, in combination, an axle, a knuckle having a pivot mount thereat including a bushing fixed in said knuckle, a bearing associated with said knuckle, a passageway longitudinally of the bushing, admitting lubricant to the bearing face thereof, an outlet port through said bushing and a conduit leading from said port to said associated bearing.

45. In a motor vehicle, in combination, a steering knuckle having associated bearings, an axle mount therefor including a bushing near the upper end of said knuckle rigid with one of said members and a bearing stud therein rigid with the other of said members, means admitting lubricant from a fixed source into a longitudinal groove at the bearing face of the bushing, and a conduit communicating with said bearing face through a port therein peripherally spaced relative to said groove, said conduit draining to an associated bearing on said knuckle.

46. In a motor vehicle, in combination, an axle, a king pin fixed therein, a knuckle having a clevis straddling said axle and encircling the protruding ends of said king pin, a bushing fixed in the upper clevis jaw and bearing about the upper end of said king pin, a thrust bearing sustaining the axle upon the lower clevis jaw, and a control bearing carried by the knuckle, a cap fixed to the upper end of said king pin and effecting a dust tight closure with respect to said knuckle, means admitting lubricant through said cap to the upper end of said bushing, said bushing having a groove at its exterior and a groove at its interior, means admitting lubricant through said cap to divide between said grooves, a conduit carried by the knuckle draining said exterior groove and leading to said control bearing, and an axial bore in said king pin draining lubricant from the interior groove to supply said thrust bearing.

47. In a motor vehicle, in combination, an axle, a king pin pivot mount, a knuckle having control bearings, one of said elements including a clevis straddling the other element and encircling the ends of said king pin, a bushing fixed in the upper clevis jaw and encircling the upper end of said king pin, a cap above the upper end of said king pin, means admitting lubricant through said cap to the upper end of said bushing, said bushing being provided with spaced passageways, means admitting lubricant through said cap to said passageways, a conduit in the knuckle draining one of said passageways and leading to one of the control bearings thereof and a second conduit in said knuckle, draining lubricant from the other passageway and leading the lubricant to another control bearing.

48. In a motor vehicle, in combination, an axle and a knuckle, one of which elements is provided with a clevis having upper and lower clevis jaws straddling the other element, said knuckle having control bearings and a king pin pivot mount for said knuckle on said axle, said clevis jaws bearing on the ends of the king pin, a bushing fixed in the upper clevis jaw and encircling the upper end of said king pin, a thrust bearing sustaining the axle upon the knuckle, inlet means admitting lubricant to the upper end of said bushing, said bushing being provided with separated grooves extending axially of the bushing, means admitting lubricant to said grooves, a conduit carried by the knuckle draining one of said grooves and leading to one of the control bearings thereof, a radial bore in said king pin draining lubricant from the other groove into a longitudinal bore in the king pin leading to said thrust bearing, and a conduit carried by the knuckle and leading to another control bearing and draining lubricant from the bearing face of the bushing.

49. In a motor vehicle, in combination, an axle, a knuckle having a pivotal mount thereat, bearings carried by said knuckle, a pair of distinct conduits extending downward from near the upper end of said knuckle to said bearings, a lubricant inlet rigid with the axle and passing lubricant to said knuckle substantially free from pressure, and pin restricted means effecting a division of the admitted lubricant and delivering said lubricant in predetermined proportions to said conduits.

50. In combination, an axle, a knuckle, a pivot member, a thrust bearing sustaining the axle upon the knuckle, means rigid with said axle to admit lubricant to the knuckle structure, a bearing associated with said knuckle, said structure having a cavity near the upper end thereof collecting lubricant from said inlet, a longitudinal bore through the pivot axis draining lubricant from said cavity to said thrust bearing, a longitudinal passage independent of said longitudinal bore draining from said cavity, and a conduit connected to the outlet of said passage and leading to said associated bearing.

51. In a motor vehicle, in combination, an axle, a knuckle having a pivot bearing thereat, a lubricant inlet on said axle and above said pivot bearing and delivering into a well thereabove, dividing means below said well and at said pivot bearing and draining lubricant therefrom and bearings carried by said knuckle and supplied from said dividing means.

52. In a motor vehicle, in combination, an axle, a knuckle having a pivot bearing thereat and extending thereabove, a lubricant well at the upper end of said knuckle, a closure for said well, a lubricant inlet draining into said well, conduit means enclosed by and extending along the structure of the knuckle to bearings thereof, and intervening restriction means controlling the division of lubricant from said well to said conduit means.

53. In a motor vehicle, in combination, an axle, a knuckle having a pivot mount thereat, bushings at the upper and lower ends thereof affording a bearing mount for said knuckle and a passageway drilled in the construction of said knuckle and communicating lubricant from said upper bushing to said lower bushing.

54. In a motor vehicle, in combination, an axle having a clevis, bushings press-fitted into the jaws of said clevis, a knuckle straddled by said clevis jaws and having a king pin fixed therein bearing in said bushings, bearings associated with said knuckle, a thrust bearing interposed between the upper face of said knuckle and the upper clevis jaw, means admitting lubricant from said axle to the space above said king pin and passageways longitudinally of said upper bushing independently of said king pin feeding downward to said thrust bearing, draining through apertures in the latter into downward bores in the upper face of knuckle and a pair of conduits carried by said knuckle and leading lubricant from said bores to said associated bearings, the thrust bearing being composed of two disks one rigid in respect to the upper bushing and the other to the knuckle and being encircled by a dust proofing annular enclosure free from interference with the swiveling action thereof.

55. In a motor vehicle, in combination, an axle having a clevis, a knuckle extending between the jaws of the clevis and having a king pin therein, a bushing press-fitted in the upper clevis jaw and affording a bearing for the king pin end, a thrust bearing comprising a lower washer on the knuckle and an upper washer substantially against the upper axle clevis jaw, a cap secured to the clevis jaw and having a pilot flange extending thereinto above the bushing, a lubricant inlet fitting feeding into said cap from the axle, dividing passageways in said cap feeding through corresponding nozzles in the pilot flange, said bushing having longitudinal grooves aligned with the respective nozzles extending through the upper thrust bearing and draining past the upper thrust washer to conduits carried by the knuckle, the bushing having diametrically opposite upstanding walls integral therewith fitting into corresponding depressions in the cap and affording barriers to prevent admixture of lubricant delivered to the bushing grooves from the nozzles in the pilot flange.

56. In a motor vehicle, in combination, an axle and a knuckle one having a clevis with upper and lower jaws and the other being straddled by the jaws thereof, a king pin pivot mount between these elements, a thrust bearing to sustain the axle upon the knuckle, and a dust-tight bearing for the lower end of the king pin, said bearing comprising a bushing cup threaded into the lower clevis jaw about the king pin end and having an annular extension at the upper end thereof protruding into a corresponding countersink in the straddled member affording small clearance and a lubricating installation feeding said thrust bearing and said bushing cup having an inlet above both said thrust bearing and bushing cup and a conduit system inside of said axle and knuckle leading thereto, the extension being beveled inwardly and the straddled member being provided with a corresponding bevel.

57. In a motor vehicle, in combination, an axle, a king pin pivot mount, a knuckle having control bearings, said knuckle including a clevis having upper and lower clevis jaws straddling the axle, and encircling the ends of said king pin, a bushing fixed in the upper clevis jaw and encircling the upper and lower ends of said king pin, inlet means admitting lubricant to the upper end of said bushing, said bushing having longitudinal passageways on opposite sides thereof, and a conduit system carried by the knuckle passageways leading to said bearings and supplied from said passageway, the other longitudinal passageway communicating with the outlet of the first mentioned passageway and serving to vent it.

58. In a motor vehicle, in combination, an axle, a knuckle having a pivot mount with upper and lower control bearings, a thrust bearing sustaining said axle, means supplying lubricant to said thrust and said control bearings from a source on the axle, said means including an inlet from the axle, a wall at the upper end of the knuckle fed from said inlet and directly supplying the upper bearing, a longitudinal bore axially through said pivot mount feeding to said thrust and lower bearings, a longitudinal groove in the upper end of said pivot mount extending through said upper bearing and a radial passageway through the upper end of the pivot mount receiving lubricant from said groove and supplying it to said longitudinal bore.

59. In a motor vehicle, in combination, an axle, a knuckle having a well at the upper end thereof and a pivot mount on said axle with upper and lower control bearings, a thrust bearing sustaining said axle, means supplying lubricant to said thrust and said control bearings from a source on the axle, said means draining into the well at the upper end of the knuckle and supplying the upper control bearings, a longitudinal bore axially through said pivot mount receiving lubricant from said well and feeding it to said thrust and lower control bearings, and a passageway through the outer portion of the upper end of the pivot mount draining lubricant from said well through said upper bearing and supplying lubricant to said longitudinal bore.

Signed at New York city in the county of New York and State of New York this 10th day of September, A. D. 1925.

JOSEPH BIJUR.